United States Patent
Allu Balan et al.

(10) Patent No.: US 12,149,566 B1
(45) Date of Patent: Nov. 19, 2024

(54) CALL SESSION CONTROL FUNCTION (CSCF) RESELECTION IN WIRELESS COMMUNICATION NETWORKS

(71) Applicant: T-MOBILE INNOVATIONS LLC, Overland Park, KS (US)

(72) Inventors: Harikishore Allu Balan, Lynnwood, WA (US); Saqib Badar, Bellevue, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 18/346,986

(22) Filed: Jul. 5, 2023

(51) Int. Cl.
*H04L 65/1045* (2022.01)
*H04L 65/1016* (2022.01)
*H04L 65/1069* (2022.01)
*H04L 65/1104* (2022.01)

(52) U.S. Cl.
CPC ...... *H04L 65/1045* (2022.05); *H04L 65/1016* (2013.01); *H04L 65/1069* (2013.01); *H04L 65/1104* (2022.05)

(58) Field of Classification Search
CPC ....... H04W 8/04; H04W 8/24; H04W 60/005; H04L 65/1016; H04L 65/1045; H04L 65/1104; H04L 61/4588
See application file for complete search history.

(56) References Cited

U.S. PATENT DOCUMENTS

| | | | |
|---|---|---|---|
| 9,246,824 B2 | 1/2016 | Ku et al. | |
| 10,231,275 B2* | 3/2019 | Chiang | H04W 76/16 |
| 10,356,673 B2 | 7/2019 | Wong et al. | |
| 10,681,762 B2* | 6/2020 | Chiang | H04L 65/1016 |
| 10,708,023 B2* | 7/2020 | Kaul | H04L 65/1069 |
| 11,277,717 B2* | 3/2022 | Zaifuddin | H04L 65/1016 |
| 11,910,474 B1* | 2/2024 | Badar | H04W 8/04 |
| 2007/0019545 A1* | 1/2007 | Alt | H04L 63/0428 370/230 |
| 2007/0022289 A1* | 1/2007 | Alt | H04L 63/0281 713/168 |
| 2008/0075114 A1* | 3/2008 | Mo | H04L 65/1016 370/466 |
| 2010/0220703 A1* | 9/2010 | Farrugia | H04L 65/80 370/338 |

(Continued)

*Primary Examiner* — David R Lazaro

(57) ABSTRACT

Various embodiments comprise a wireless communication network to support Internet Protocol Multimedia Subsystem (IMS) voice calling. In some examples, the wireless communication network comprises Call Session Control Function (CSCF) circuitry and E.164 Number Mapping (ENUM) circuitry. The CSCF circuitry receives a Mobile Originating Session Initiation Protocol (MO IMS) invite message from an originating User Equipment (UE). The CSCF circuitry performs an ENUM query for the destination number to route the invite to the terminating UE network. The ENUM circuitry responds with routing information and realm information for the terminating UE. The CSCF circuitry stores the realm type in association with the MO SIP invite and transfers the MO SIP invite. The CSCF circuitry receives an error response from the peer network for the SIP invite. The CSCF circuitry determines if retry is allowed based on the realm type. If retry is allowed, the CSCF circuitry transfers a retry request.

20 Claims, 11 Drawing Sheets

(56) References Cited

U.S. PATENT DOCUMENTS

| | | | |
|---|---|---|---|
| 2014/0092853 A1* | 4/2014 | Noldus | H04L 65/1016 |
| | | | 370/329 |
| 2015/0282242 A1* | 10/2015 | Merino Vazquez | H04W 76/19 |
| | | | 370/221 |
| 2019/0335534 A1 | 10/2019 | Atarius et al. | |
| 2020/0170064 A1 | 5/2020 | Keller et al. | |
| 2021/0160666 A1* | 5/2021 | Zaifuddin | H04W 36/00226 |

* cited by examiner

CALL SESSION CONTROL FUNCTION (CSCF) RESELECTION IN WIRELESS COMMUNICATION NETWORKS

TECHNICAL FIELD

Various embodiments of the present technology relate to Internet Protocol Multimedia Subsystem (IMS) voice calling, and more specifically, to invite message route advance in response to call setup failure.

BACKGROUND

Wireless communication networks provide wireless data services to wireless user devices. Exemplary wireless data services include machine-control, internet-access, media-streaming, online gaming, and social-networking. Exemplary wireless user devices comprise phones, computers, vehicles, robots, and sensors. Radio Access Networks (RANs) exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The RANs exchange network signaling and user data with network elements that are often clustered together into wireless network cores over backhaul data links. The core networks execute network functions to provide wireless data services to the wireless user devices.

An Internet Protocol Multimedia Subsystem (IMS) delivers Internet Protocol (IP) multimedia services like voice calling and video conferencing to wireless user devices. The IMS distributes IP addresses to the wireless user devices to facilitate communications between the wireless user devices. The IMS interfaces with wireless network cores to exchange Session Initiation Protocol (SIP) messages with the wireless user devices to communicate with the wireless user devices. The IMS comprises network functions and network elements like Call Session Control Function (CSCF), Telephony Application Server (TAS), and E.164 Number Mapping (ENUM).

When an originating wireless user device begins an IMS voice session with a terminating user device in a different wireless communication network, the originating user device transfers an invite message to the IMS. The IMS routes the invite message to the different wireless communication network for delivery to the terminating user device. Malfunctions often occur in the wireless communication networks that prevent delivery of the invite message thereby preventing establishment of the IMS voice session. When such a malfunction occurs, the IMS will transfer a retry requests to the wireless communication network of the terminating user device in an attempt to complete setup of the voice session. This retry process is referred to as route advance. However, not every wireless communication network possesses route advance capabilities and route advance attempts are often unsuccessful. Repeated route advance requests with incapable or non-responsive communication networks results in excessive IMS signaling.

Unfortunately, wireless communication networks do not efficiently perform route advance in response to initial call setup failure. Moreover, IMS does not effectively associate network route advance capabilities with IMS requests.

Overview

This Overview is provided to introduce a selection of concepts in a simplified form that are further described below in the Technical Description. This summary is not intended to identify key features or essential features of the claimed subject matter, nor is it intended to be used as an aid in determining the scope of the claimed subject matter.

Various embodiments of the present technology relate to solutions for Internet Protocol Multimedia Subsystem (IMS) voice calling. Some embodiments comprise a method of operating a wireless communication network to perform route advance for IMS voice calls. The method comprises receiving a Mobile Originating Session Initiation Protocol (MO SIP) invite message sent from an originating User Equipment (UE) for a voice call to a terminating UE. The method further comprises retrieving routing data for the MO SIP invite and a realm type for the terminating UE. The method further comprises transferring the MO SIP invite based on the routing data. The method further comprises storing the realm type in association with the MO SIP invite.

Some embodiments comprise a wireless communication network to perform route advance for IMS voice calls. The wireless communication network comprises Call Session Control Function (CSCF) circuitry and E.164 Number Mapping (ENUM) circuitry. The CSCF circuitry receives a MO SIP invite message sent from an originating UE for a voice call to a terminating UE. The CSCF circuitry transfers a request to the ENUM circuitry to route the MO SIP invite. The ENUM circuitry receives the request, determines routing information for the MO SIP invite, determines a realm type for the terminating UE, and indicates the routing information and the realm type to the CSCF circuitry. The CSCF circuitry receives the routing information and the realm type, transfers the MO SIP invite based on the routing information, and stores the realm type in association with the MO SIP invite.

DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
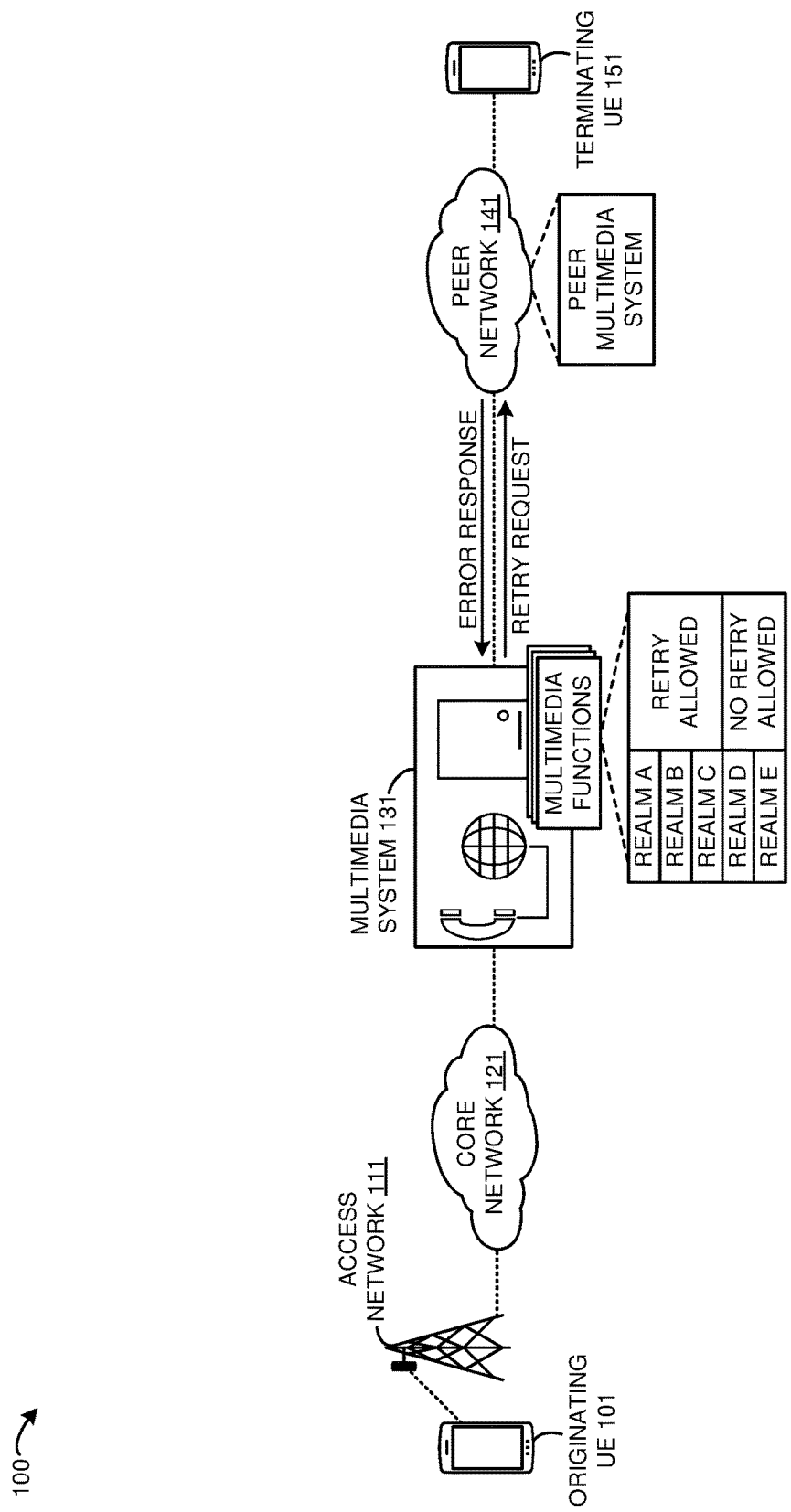
FIG. 1 illustrates a wireless communication network to perform realm-based route advance.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

TECHNICAL DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 illustrates wireless communication network 100 network to perform realm-based route advance. Wireless communication network 100 delivers services like voice calling machine communications, internet-access, media-streaming, or some other wireless communications product to user devices. Wireless communication network 100 comprises originating User Equipment 101, access network 111, core network 121, and multimedia system 131. FIG. 1 further illustrates peer network 141 which comprises terminating UE 151. In other examples, wireless network communication network 100 and peer network 141 may comprise additional or different elements than those illustrated in FIG. 1.

Various examples of network operation and configuration are described herein. In some examples, multimedia system 131 receives a voice call request generated by originating UE 101 for terminating UE 151. The voice call request may comprise a Mobile Originating Session Initiation Protocol (MO SIP) invite message. The multimedia functions hosted by multimedia system 131 process the voice call request and determine the realm of terminating UE 151. The realm indicates which wireless communication network terminating UE 151 is resident on. In this case, the multimedia functions determine peer network 141 is the realm of UE 151. The multimedia functions associate the voice call with request with the realm of terminating UE 151 and cache the association in memory. The multimedia functions transfer the voice call request to the multimedia system resident in peer network 141 to establish the requested voice call. Subsequently, the multimedia functions resident in multimedia system 131 receive an error response from peer network 141. For example, the error response may comprise an explicit error response from the multimedia system resident in peer network 141 or a request timeout. The multimedia functions maintain a table that tracks when call retry is allowed for different realm types. As illustrated in FIG. 1, retry is allowed for realms A, B, and C and retry is not allowed from realms D and E. In some examples, the table may only list allowed realms while unlisted realms are assumed to be ineligible for call retry. The multimedia functions compare the realm type for terminating UE 151 to the table and responsively determine retry is allowed. In response to determining retry is allowed, the multimedia functions in multimedia system 131 transfer a retry request to the multimedia system in peer network 141 to establish the voice call voice call with terminating UE 151. For example, the retry request may comprise a route advance process to reselect a peer network multimedia function to attempt to complete the voice call setup.

Originating UE 101 and terminating UE are representative of wireless user devices. Exemplary user devices include phones, computers, vehicles, robots, sensors, and/or other devices with wireless communication capabilities. Access network 111 exchanges wireless signals with originating UE 101 over radio frequency bands. The radio frequency bands use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). Access network 111 is connected to core network 121 over backhaul data links. Access network 111 exchanges network signaling and user data with network elements in core network 121. Access network 111 may comprise a wireless access point, a Radio Access Networks (RAN), internet backbone providers, edge computing systems, or other types of wireless/wireline access systems to provide wireless/wireline links to originating UE 101, the backhaul data links, and edge computing services between originating UE 101 and core network 121.

Access network 111 may comprise Radio Units (RUs), Distributed Units (DUs) and Centralized Units (CUs). The RUs may be mounted at elevation and have antennas, modulators, signal processors, and the like. The RUs are connected to the DUs which are usually nearby network computers. The DUs handle lower wireless network layers like the Physical Layer (PHY), Media Access Control (MAC), and Radio Link Control (RLC). The DUs are connected to the CUs which are larger computer centers that are closer to core network 121. The CUs handle higher wireless network layers like the Radio Resource Control (RRC), Service Data Adaption Protocol (SDAP), and Packet Data Convergence Protocol (PDCP). The CUs are coupled to network functions in core network 121.

Core network 121 and multimedia system 131 are representative of computing systems that provide wireless data services to originating UE 101 over access network 111. Exemplary computing systems comprise data centers, server farms, cloud computing networks, hybrid cloud networks, and the like. The computing systems of core network 121 store and execute the network functions to provide wireless data services to originating UE 101 over access network 111. Exemplary network functions include Access and Mobility Management Function (AMF), Session Management Function (SMF), and User Plane Function (UPF). Core network 121 may comprise a Fifth Generation Core (5GC) architecture and/or an Evolved Packet Core (EPC) architecture.

The computing systems of multimedia system 131 store and execute multimedia functions to provide services like voice calling, video conferencing, and text messaging to originating UE 101. Exemplary multimedia functions include Call Session Control Function (CSCF), E.164 Number Mapping (ENUM) Telephony Application Server (TAS), and Short Message Service Application Server (SMS AS), Breakout Gateway Control Function (BGCF), and Interconnect Session Border Controller (ISBC). Multimedia system 131 may comprise an Internet Protocol Multimedia Subsystem (IMS) core architecture. For example, multimedia system 131 may receive text messages or voice call requests sent by originating UE 101 and route the text messages and voice call requests to their respective message destinations.

Figure 2:
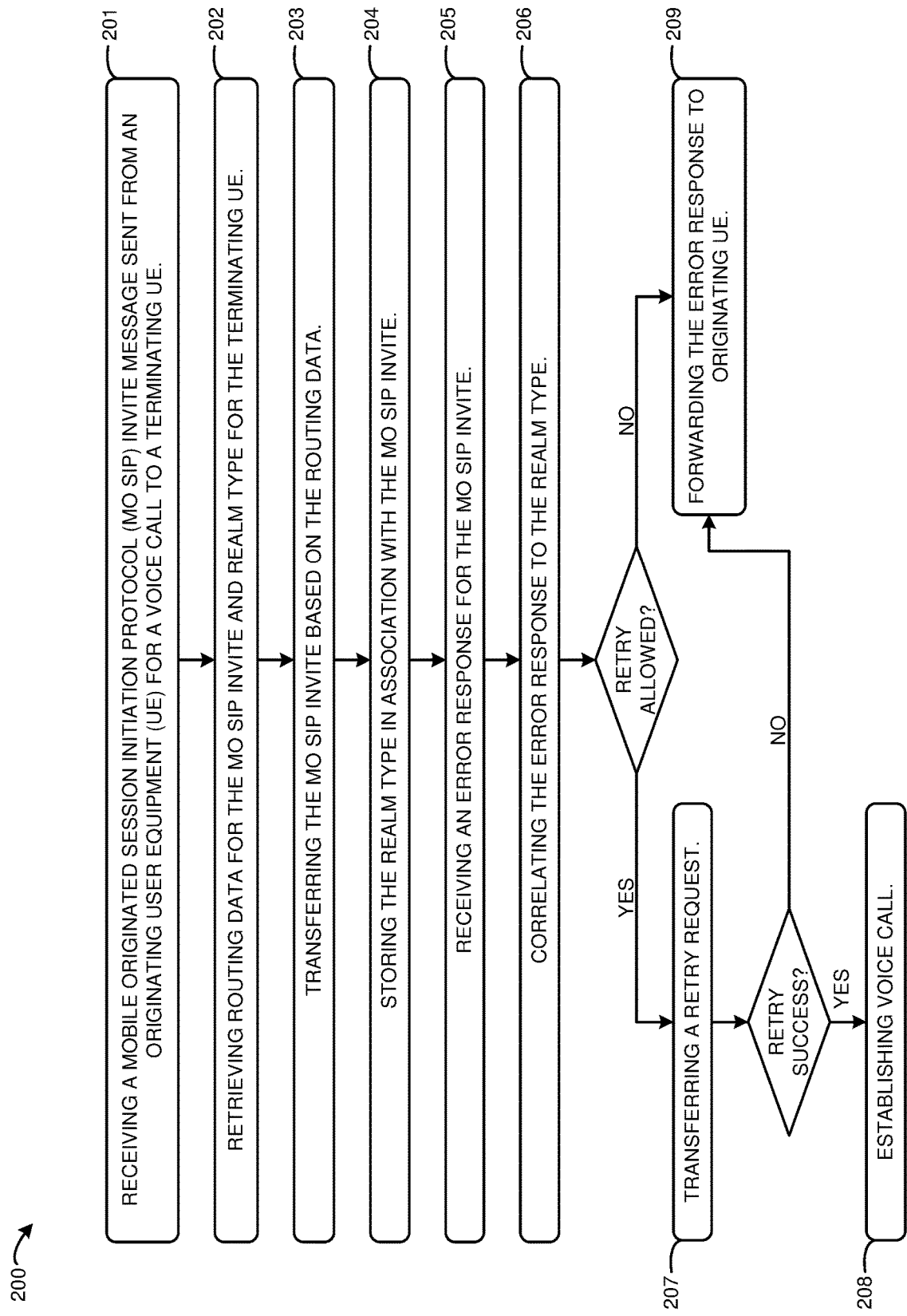
FIG. 2 illustrates an exemplary operation of the wireless communication network to perform realm-based route advance.

FIG. 2 illustrates process 200. Process 200 comprises an exemplary operation of wireless communication network 100 to perform realm-based route advance. The operation may vary in other examples. The operations of process 200 comprise receiving an MO SIP invite message from an originating UE for a voice call to a terminating UE (step 201). The operations further comprise retrieving routing data for the MO SIP invite and realm type data for the terminating UE (step 202). The operations further comprise transferring the MO SIP invite based on the routing data (step 203). The operations further comprise storing the realm type data in association with the MO SIP invite (step 204). The operations further comprise receiving an error response for the MO SIP invite (step 205). The operations further comprise correlating the error response to the realm type (step 206). If the realm type for the terminating UE does not qualify for route advance, the operations proceed by forwarding the error response to the originating UE (step 209). If the realm type for the terminating UE qualifies for route advance, the operations proceed by transferring a retry request (step 207). If the retry request is unsuccessful (e.g., receiving a second error message), the operations proceed by forwarding the error response to the originating UE (step 209). If the retry request is successful, the operations proceed by establishing the voice call with the terminating UE (step 208).

Figure 3:
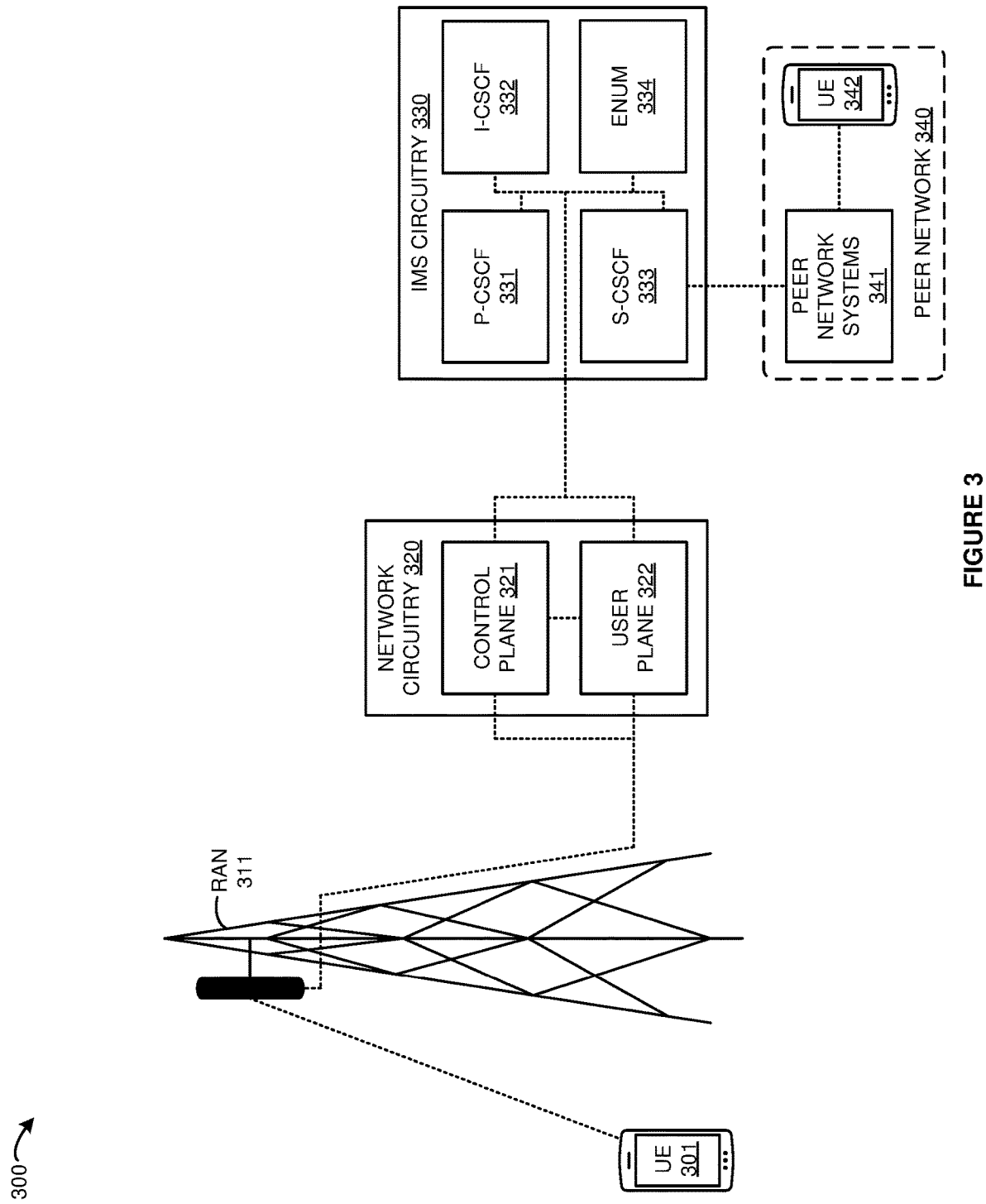
FIG. 3 illustrates a wireless communication network to perform realm-based route advance.

FIG. 3 illustrates wireless communication network 300 network to perform realm-based route advance for IMS voice calls. Wireless communication network 300 is an example of wireless network 100, however network 100 may differ. Wireless communication network 300 comprises UE 301, RAN 311, network circuitry 320, and IMS circuitry 330. Network circuitry 320 comprises control plane 321 and user plane 322. IMS circuitry 330 comprises Proxy Call Session Control Function (P-CSCF) 331, Interrogating Call Session Control Function (I-CSCF) 332, Serving Call Session Control Function (S-CSCF) 333 and ENUM 334. FIG. 3 also illustrates peer network 340 which comprises peer network systems 341 and UE 342. Peer network systems 341 is representative of the network circuitry, IMS circuitry, and RANs that provide the wireless network infrastructure to peer network 340. In other examples, wireless network 300 may comprise additional or different elements than those illustrated in FIG. 3.

In some examples, UE 301 attaches to network circuitry 320 over RAN 311. UE 301 registers with IMS circuitry 330 over control plane 321 for IMS services like text messaging and voice calling. Once registered, UE 301 generates an MO SIP invite for UE 342 to begin a voice call. UE 301 transfers the SIP invite over RAN 311 to user plane 322. User plane 322 transfers the SIP invite to P-CSCF 331 in IMS circuitry 330 which forwards the SIP invite to S-CSCF 333. S-CSCF 333 interfaces with ENUM 334 to translate the called phone number of UE 342 to a terminating SIP Uniform Resource Indicator (URI). ENUM 334 identifies the realm (i.e., home network) of terminating UE 342 is outside of wireless communication network 300. In this case, UE 342's realm is peer network 340. ENUM 334 indicates the SIP URI and the realm Identifier (ID) of terminating UE 342 to S-CSCF 333. S-CSCF 333 interacts with other IMS functions like I-CSCF 332 and border controllers to transfer the MO SIP invite to peer network 340 for delivery to UE 342 based on the SIP URI. S-CSCF 333 stores the realm ID for terminating UE 342 in association with the MO SIP invite sent by UE 301.

Subsequent to transferring the MO SIP invite, an error occurs in peer network 340 that prevents the MO SIP invite from being delivered to terminating UE 342. For example, the IMS in peer network systems 341 may be overloaded which prevents delivery of the MO SIP invite. S-CSCF 333 detects the error for the MO SIP invite. S-CSCF 333 retrieves the cached realm ID associated with the MO SIP invite and determines if the realm ID qualifies for route advance. For example, S-CSCF 333 may host a data structure that correlates realm IDs to route advance allowability. S-CSCF 333 may enter the realm ID for the MO SIP invite to the data structure and the data structure may output an indication on allowability. In this example, S-CSCF 333 determines peer network 340 qualifies for route advance. S-CSCF 333 interfaces with the other IMS functions to transfer a retry request to peer network systems 341. For example, S-CSCF 333 may drive a border controller to reselect an IMS entity (e.g., S-CSCF) in peer network 340. If the retry attempt is successful, S-CSCF 333 establishes the voice call for UE 301. UE 301 exchanges voice packets for the voice session with user plane 322 over RAN 311. User plane 322 exchanges the voice packets over IMS 330 and peer network systems 341 with terminating UE 342. However, if peer network 340 does not qualify for route advance or the retry attempt was not successful, S-CSCF 333 transfers an error notification for delivery to UE 301.

Advantageously, wireless communication network 300 efficiently transfers retry requests in response to initial call setup failure. Moreover, IMS circuitry 330 effectively associates peer network route advance capabilities with IMS session requests.

UE 301 and RAN 311 communicate over links using wireless/wired technologies like 5GNR, LTE, LP-WAN, WIFI, Bluetooth, and/or some other type of wireless or wireline networking protocol. The wireless technologies use electromagnetic frequencies in the low-band, mid-band, high-band, or some other portion of the electromagnetic spectrum. The wired connections comprise metallic links, glass fibers, and/or some other type of wired interface. RAN 311, network circuitry 320, IMS circuitry 330, and peer network 340 communicate over various links that use metallic links, glass fibers, radio channels, or some other communication media. The links use Fifth Generation Core (5GC), IEEE 802.3 (ENET), Time Division Multiplex (TDM), Data Over Cable System Interface Specification (DOCSIS), Internet Protocol (IP), General Packet Radio Service Transfer Protocol (GTP), 5GNR, LTE, WIFI, virtual switching, inter-processor communication, bus interfaces, and/or some other data communication protocols.

UE 301 and UE 342 may comprise phones, vehicles, computers, sensors, drones, robots, or other types of data appliances with wireless and/or wireline communication circuitry. Although RAN 311 is illustrated as a tower, RAN 311 may comprise another type of mounting structure (e.g., a building), or no mounting structure at all. RAN 311 comprises a Fifth Generation (5G) RAN, LTE RAN, gNodeB, eNodeB, NB-IoT access node, LP-WAN base station, wireless relay, WIFI hotspot, Bluetooth access node, and/or another wireless or wireline network transceiver. UE 301 and RAN 311 comprise antennas, amplifiers, filters, modulation, analog/digital interfaces, microprocessors, software, memories, transceivers, bus circuitry, and the like. Control plane 321 comprises network functions like AMF, SMF, and the like. User plane 322 comprises network functions like UPF, edge UPF, and the like.

UE 301, RAN 311, network circuitry 320, IMS circuitry 330, peer network systems 341, and UE 342 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), Field Programmable Gate Array (FPGA), and/or the like. The memories comprise Random Access Memory (RAM), flash circuitry, Solid State Drives (SSD), Non-Volatile Memory Express (NVMe) SSDs, Hard Disk Drives (HDDs), and/or the like. The memories store software like operating systems, user applications, radio applications, network functions, and multimedia functions. The microprocessors retrieve the software from the memories and execute the software to drive the operation of wireless communication network 300 as described herein.

Figure 4:
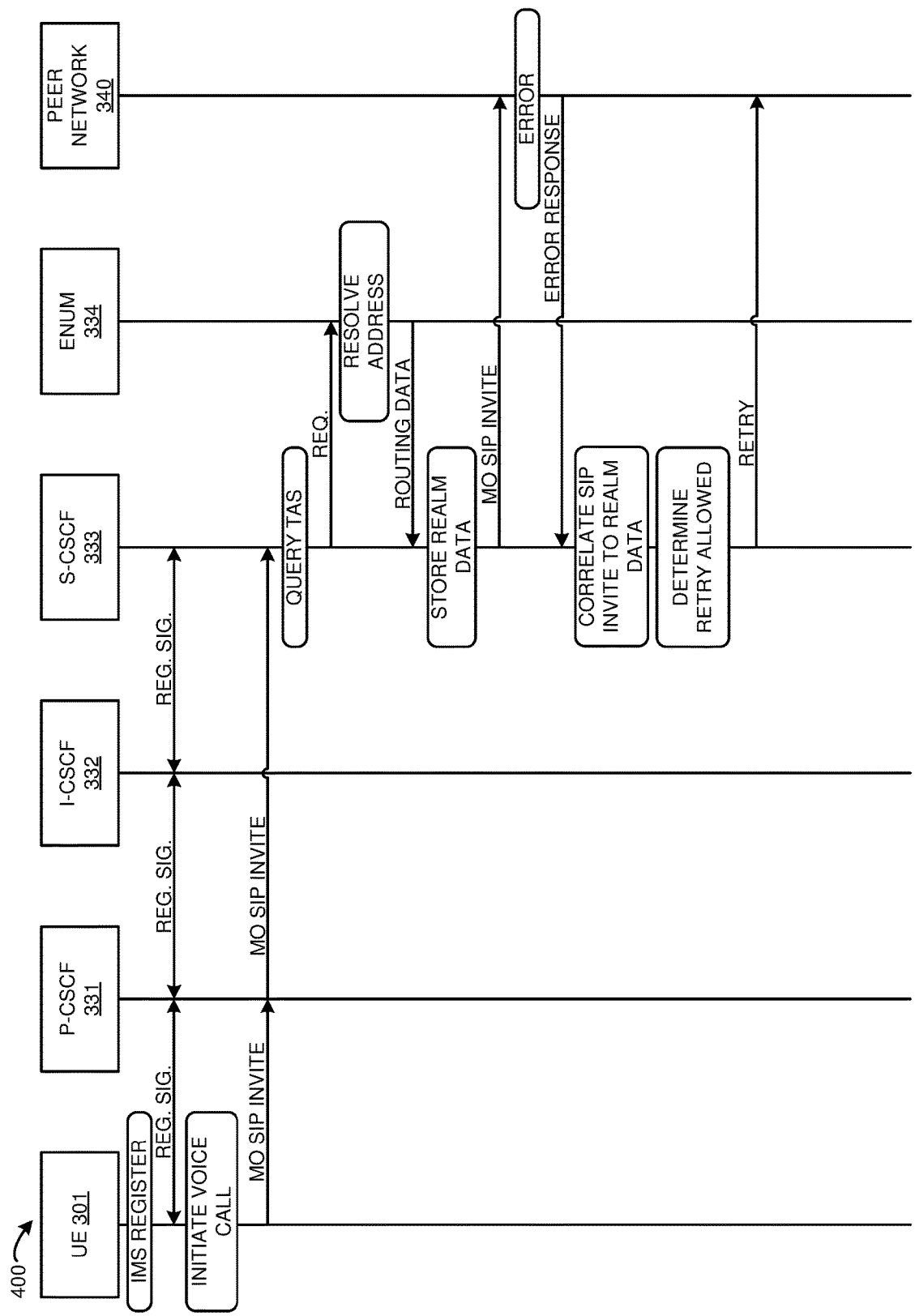
FIG. 4 illustrates an exemplary operation of the wireless communication network to perform realm-based route advance.

FIG. 4 illustrates process 400. Process 400 comprises an exemplary operation of wireless communication network 300 to perform realm-based route advance for IMS voice calls. In operation, UE 301 attaches to network circuitry 320 over RAN 311. UE 301 transfers exchanges IMS registration signaling (REG. SIG.) with P-CSCF 331, I-CSCF 332, and S-CSCF over control plane 321 to register with IMS circuitry 330. Once registered, UE 301 transfers an MO SIP invite for a voice call with UE 342 to P-CSCF 331. P-CSCF 331 receives the SIP invite and forwards the invite to S-CSCF 333. S-CSCF 333 transfers a translation request to ENUM 334 to translate the phone number of terminating UE 342 to a SIP URI. ENUM 334 resolves the request and identifies the realm of UE 342. ENUM 334 transfers routing data that comprises the SIP URI and realm ID for UE 342 to S-CSCF 333. S-CSCF 333 stores the realm ID in association with the SIP invite and transfers the SIP invite to peer network 340. An error occurs in peer network 340. In response to detecting the error, S-CSCF 333 correlates the SIP invite to the realm ID for UE 342 and determines if route advance retry is allowed for peer network 340. In this example, route advance is available for peer network 340. Since retry is available, S-CSCF 333 transfers the retry request to peer network 340.

Figure 5:
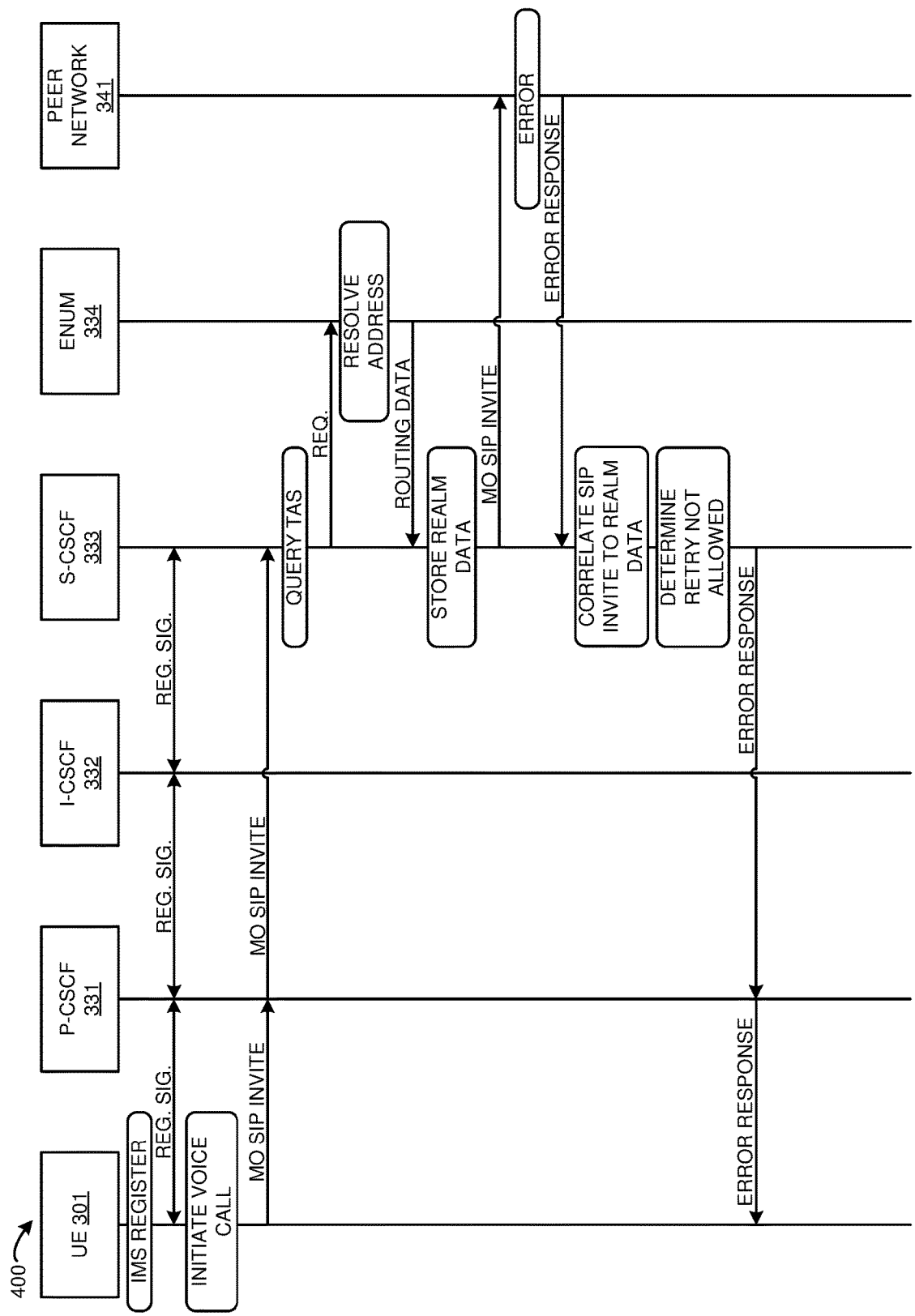
FIG. 5 illustrates an exemplary operation of the wireless communication network to perform realm-based route advance.

FIG. 5 illustrates process 400. Process 500 comprises an exemplary operation of wireless communication network 300 to perform realm-based route advance for IMS voice calls. In operation, UE 301 attaches to network circuitry 320 over RAN 311. UE 301 transfers exchanges IMS registration signaling with P-CSCF 331, I-CSCF 332, and S-CSCF over control plane 321 to register with IMS circuitry 330. Once registered, UE 301 transfers an MO SIP invite for a voice call with UE 342 to P-CSCF 331. P-CSCF 331 receives the SIP invite and forwards the invite to S-CSCF 333. S-CSCF 333 transfers a translation request to ENUM 334 to translate the phone number of terminating UE 342 to a SIP URI. ENUM 334 resolves the request and identifies the realm of UE 342. ENUM 334 transfers routing data that comprises the SIP URI and realm ID for UE 342 to S-CSCF 333. S-CSCF 333 stores the realm ID in association with the SIP invite and transfers the SIP invite to peer network 340. An error occurs in peer network 340. In response to detecting the error, S-CSCF 333 correlates the SIP invite to the realm ID for UE 342 and determines if route advance retry is allowed for peer network 340. In this example, route advance is not available for peer network 340. Consequently, S-CSCF 333 transfers an error notification for delivery to UE 301.

Figure 6:
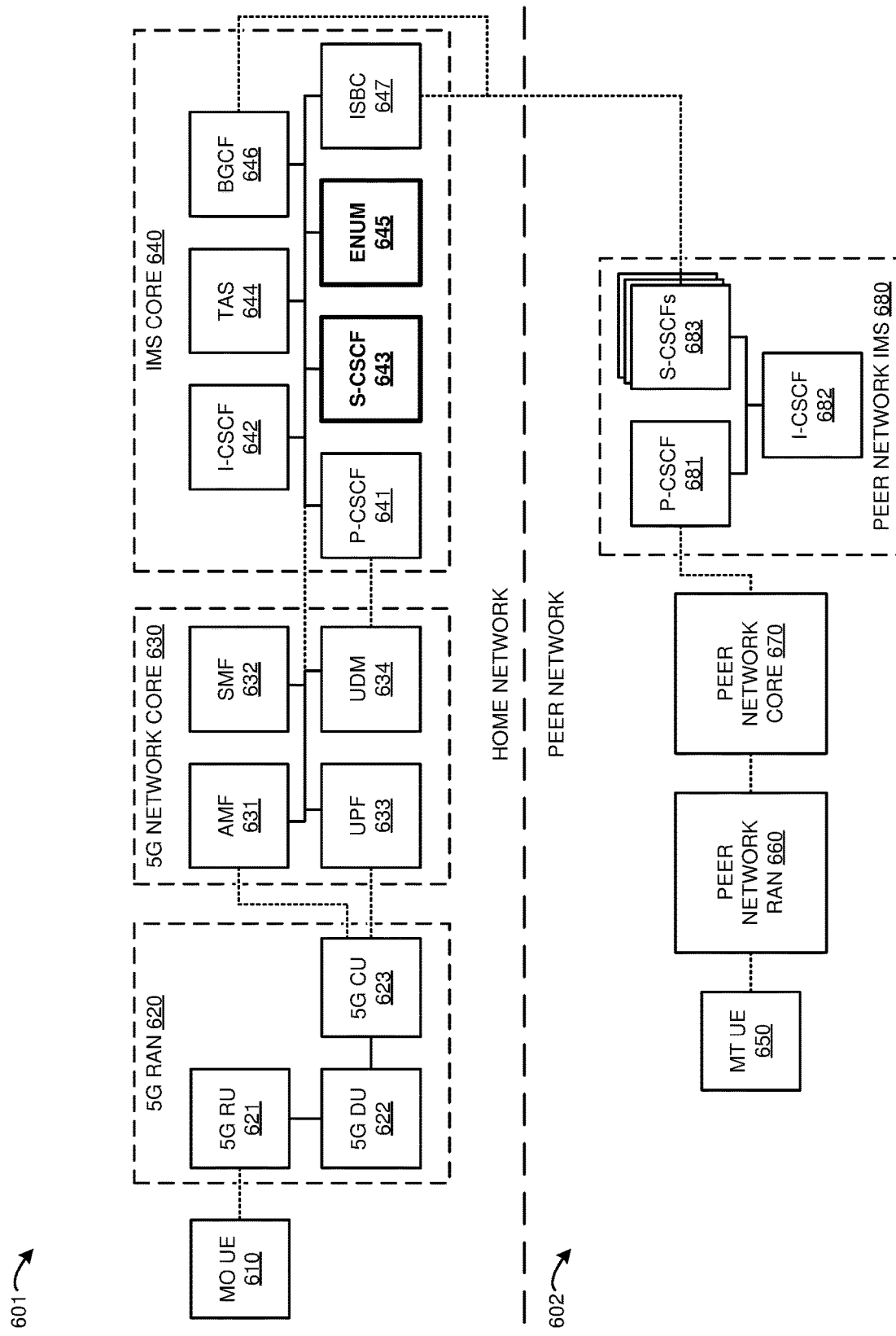
FIG. 6 illustrates a Fifth Generation (5G) wireless communication network to perform realm-based route advance.

FIG. 6 illustrates 5G communication network 601 to perform realm-based route advance for IMS voice calls and illustrates peer network 602. 5G communication network 601 comprises an example of wireless communication networks 100 and 300, although networks 100 and 300 may differ. Peer network 602 comprises an example of peer networks 141 and 340, although networks 141 and 340 may differ. 5G communication network 601 comprises Mobile Originating (MO) UE 610, 5G RAN 620, 5G network core 630, and IMS core 640. 5G RAN 620 comprises 5G Radio Unit (RU) 621, 5G Distributed Unit (DU) 622, and 5G Centralized Unit (CU) 623. 5G network core 630 comprises AMF 631, SMF 632, UPF 633, and UDM 634. IMS core 640 comprises P-CSCF 641, I-CSCF 642, S-CSCF 643, TAS 644, ENUM 645, BGCF 646, and ISBC 647. Other network functions and network elements like Authenticating Server Function (AUSF), Network Slice Selection Function (NSSF), Policy Control Function (PCF), Network Repository Function (NRF), Network Exposure Function (NEF), Application Function (AF), Unified Data Registry (UDR), Home Subscriber Service (HSS), and Domain Name Service (DNS) are typically present in 5G network core 630 but are omitted for clarity. Other IMS functions and elements like SMS AS and DNS are typically present in IMS core 640 but are omitted for clarity. Peer network 602 comprises Mobile Terminating (MT) UE 650, peer network RAN 660, peer network core 670 and peer network IMS 680. Peer network IMS 680 comprises P-CSCF 681, I-CSCF 682, and S-CSCFs 683. Other IMS elements are typically present in peer network IMS 680 however they are omitted for clarity. Peer network RAN 660, Peer network core 670, and peer network IMS 680 may comprise similar architectures to their corresponding elements of network 601. In other examples, wireless network communication network 601 and peer network 602 may comprise additional or different elements than those illustrated in FIG. 6.

In operation, UE 610 wirelessly attaches to CU 623 over DU 622 and RU 621. UE 610 exchanges attachment signaling with CU 623 to establish a connection with 5G network applications hosted by CU 623. The attachment signaling indicates information like a registration type, UE capabilities, requested slice types, IMS registration requests, Protocol Data Unit (PDU) session requests, and the like. CU 623 transfers a registration request for UE 610 and the attachment signaling information to AMF 631. In response to the registration request, AMF 631 transfers an identity request to UE 610 over RAN 620. UE 610 responds with an identity indication to AMF 631 over RAN 620. AMF 631 interacts with other network functions like UDM 634 to authenticate and authorize UE 610 for wireless data service.

Responsive to the authentication and authorization, AMF 631 retrieves Quality-of-Service (QoS) metrics, allowed slice identifiers, service attributes, IMS permissions, and the like from UDM 634. AMF 631 interfaces with other network functions to select a network slice for UE 610. For example, AMF 631 may interface with an NSSF to select a slice ID for UE 610 based on the service attributes retrieved from UDM 634. AMF 631 selects SMF 632 to serve UE 610 based on the slice ID, QoS metrics, service attributes, and/or other data retrieved UDM 634. SMF 632 selects P-CSCF 641 and UPF 633 based on the service information provided by the one of UDM 634. SMF 632 indicates the network addresses for UPF 633 and P-CSCF 641 to AMF 631. AMF 631 generates UE context for UE 610 using the received information. The UE context comprises the QoS metrics, the slice ID, the network addresses, the service attributes, and the like. AMF 631 transfers the UE context to UE 610 over RAN 620.

UE 610 generates an IMS registration request using the network address for P-CSCF 641 in the UE context to transfer the registration message to CU 623 over RU 621 and DU 622. CU 623 transfers the IMS registration request to UPF 633. UPF 633 identifies the network address in the IMS registration request and forwards the request to P-CSCF 641. P-CSCF 641 receives the request from UPF 633. P-CSCF 641 retrieves a network address for I-CSCF 642 (e.g., by DNS query) and forwards the registration request to I-CSCF 642 using the retrieved network address. I-CSCF 642 interfaces with UDM 634 to identify and select S-CSCF 643. I-CSCF 642 forwards the registration request with the network address to S-CSCF 643. S-CSCF 643 exchanges authentication signaling with UE 610 and UDM 634 to authenticate and authorize UE 610 for IMS services. For example, UDM 634 may access the subscriber profile for UE 610 to determine if UE 610 qualifies for IMS service and may indicate the qualification to S-CSCF 643. Upon authentication and authorization, S-CSCF 643 registers UE 610 and notifies P-CSCF 641. P-CSCF 641 transfers a registration accept message to UE 610 over UPF 633 and RAN 620.

Once registered, UE 610 initiates a Mobile Originated (MO) IMS voice session (or some other type of IMS media session) with Mobile Terminating (MT) IMS core 640. UE 610 generates a MO SIP invite message and addresses the message for delivery to MT UE 650. UE 610 transfers the SIP invite to CU 623 over RU 621 and DU 622. CU 623 transfers the SIP invite to UPF 633. UPF 633 forwards the SIP invite message to P-CSCF 641 which in turn forwards the SIP invite to S-CSCF 643. S-CSCF 643 receives the SIP invite notifies TAS 644 of the requested voice session. S-CSCF 643 queries ENUM 645 to determine the realm destination and translate the phone number in SIP invite to a corresponding SIP URI for MT UE 650. ENUM 645 determines peer network 602 is the realm for MT UE 650 and translates the phone number of ME 650 into a SIP URI. ENUM 645 indicates the realm data and SIP URI to S-CSCF 643. S-CSCF 643 caches the realm data for MT UE 650 in association with the MO SIP invite from MO UE 610. S-CSCF 643 transfers the SIP URI to I-CSCF 643 and directs I-CSCF 642 to transfer the MO SIP invite using the SIP URI. In response to the direction from S-CSCF 643, I-CSCF 642 controls either BGCF 646 or ISBC 647 to transfer the MO SIP invite to peer network 602. When network 601 comprises a network-to-network interface with peer network 602, I-CSCF 642 transfers the MO SIP invite over ISBC 647. When network 601 possesses an indirect connection with peer network 602, I-CSF 642 transfers the MO SIP invite over BGCF 646. BGCF 646 or ISBC 647 determines a routing path for the MO SIP invite to peer network 602 based on the SIP URI. BGCF 646 or ISBC 647 selects one of S-CSCFs 683 to transfer the SIP invite to for delivery to MT UE 650.

Subsequently, an error occurs in peer network 602 that prevents the MT UE 650 from receiving the MO SIP invite. S-CSCF 643 may detect a session timeout or peer network IMS 680 may transfer an explicit error notification to detect that the SIP invite was not delivered. In this example, the selected one of S-CSCFs 683 transfers an error notification to ISBC 647. ISBC 647 detects the error and notifies S-CSCF 643. S-CSCF 643 receives the error for the SIP invite and retrieves the realm ID for the SIP invite to memory. S-CSCF 643 maintains a table that indicates realms where retry is allowed. S-CSCF 643 compares the realm ID for peer network 602 to the table and determines route advance retry is allowed for peer network 602. In other examples, peer network 602 may not qualify for retry. Since retry is allowed, S-CSCF 643 directs ISBC 647 to perform route advance for the SIP invite. ISBC 647 selects another one of S-CSCFs 683 to reattempt setting up the voice call. In this example, the second selection is successful and the selected one of S-CSCFs 683 forwards the SIP invite to MT UE 650.

MT UE 650 accepts the call and transfers an acceptance message over peer network 602, IMS core 640, 5G network core 630, and RAN 620 to MO UE 610. In response to the acceptance, MO UE 610 exchanges voice packets for the call with UPF 633 over RAN 620. UPF 633 exchanges the voice packets with peer network core 670 over IMS core 640 and peer network IMS 680. Peer network core 670 exchanges the voice packets with MT UE 650 over peer network RAN 660. S-CSCF 643 and TAS 644 monitor and support the flow of voice packets for the duration of the call.

In some examples, peer network 602 may not qualify for route advance. In such cases, ISBC 647 may detect the error and notify S-CSCF 643. S-CSCF 643 then the SIP invite and retrieves the realm ID for the SIP invite to memory. S-CSCF 643 compares the realm ID for peer network 602 to the route advance allowability table and determines the realm ID for peer network 602 is not present. Consequently, S-CSCF 643 determines route advance is not allowed for peer network 602 and does not direct ISBC 647 to respond to the error. S-CSCF 643 forwards the error response to MO UE 610 over P-CSCF 641, UPF 633, and RAN 620. MO UE 610 may then reattempt the call.

In some examples, the route advance retry is unsuccessful. In such cases, when ISBC 647 selects another one of S-CSCFs 683 to reattempt setting up the voice call, ISBC 647 receives another error message. ISBC 647 then transfers the second error message to S-CSCF 643. S-CSCF 643 identifies the route advance has already been tried once for the SIP invite and responsively determines the SIP invite no longer qualifies for route advance. S-CSCF 643 forwards the second error response to MO UE 610 over P-CSCF 641, UPF 633, and RAN 620. MO UE 610 may then reattempt the call. Advantageously, by limiting the amount of retry attempts, S-CSCF 643 reduces the signaling burden of IMS core 640.

Figure 7:
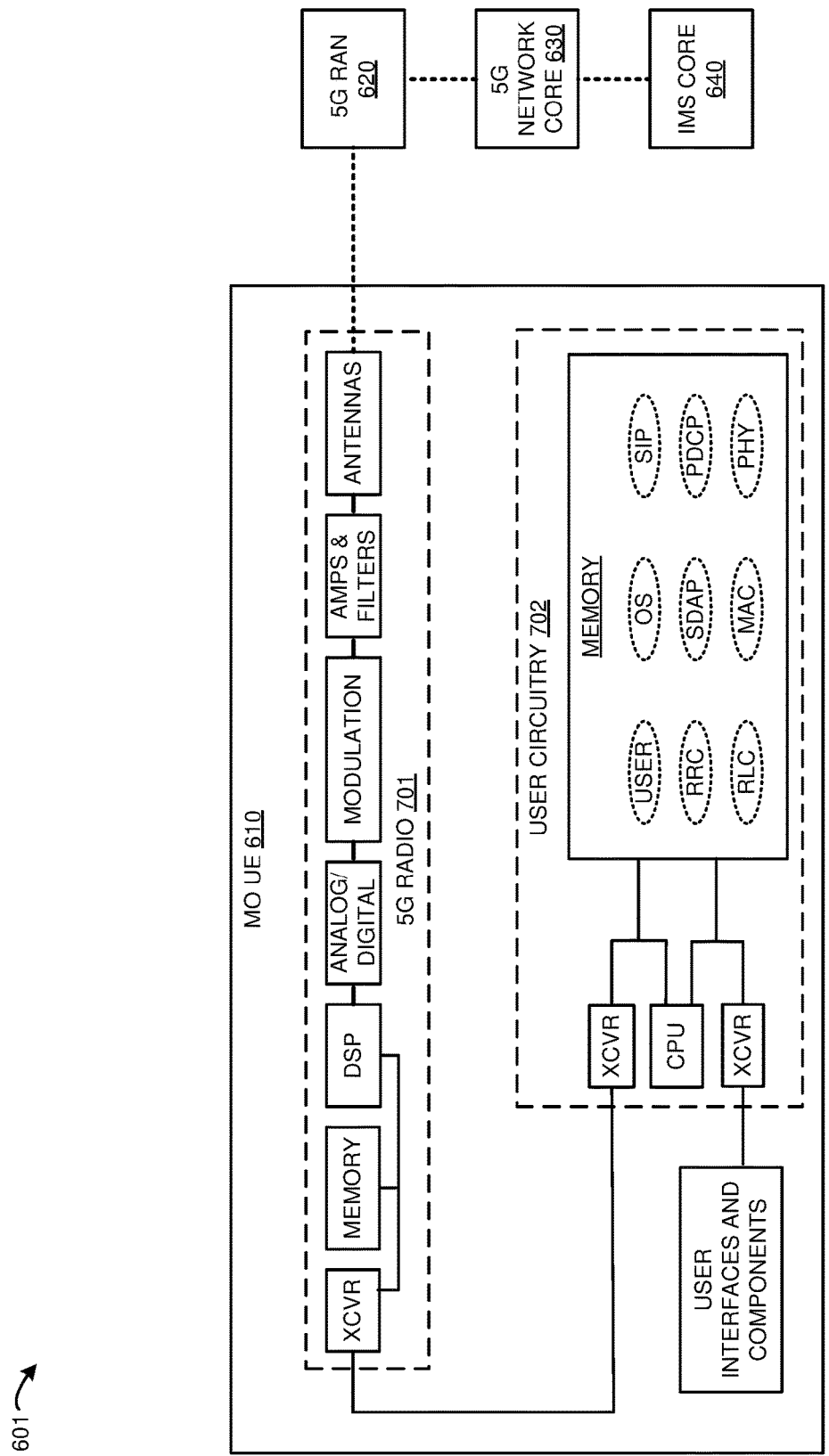
FIG. 7 illustrates a 5G User Equipment (UE) in the 5G communication network.

FIG. 7 illustrates 5G UE 610 in 5G communication network 601. UE 610 comprises an example of originating UE 101 illustrated in FIG. 1 and UE 301 illustrated in FIG. 3, however originating UE 101 and UE 301 may differ. MT UE 650 may comprise a similar structure to MO UE 610.

UE 610 comprises 5G radio 701 and user circuitry 702. Radio 701 comprises antennas, amplifiers, filters, modulation, analog-to-digital interfaces, Digital Signal Processers (DSP), memory, and transceivers (XCVRs) that are coupled over bus circuitry. User circuitry 702 comprises memory, CPU, user interfaces and components, and transceivers that are coupled over bus circuitry. The memory in user circuitry 702 stores an operating system (OS), user applications (USER), and 5GNR network applications for Physical Layer (PHY), Media Access Control (MAC), Radio Link Control (RLC), Packet Data Convergence Protocol (PDCP), Service Data Adaptation Protocol (SDAP), Radio Resource Control (RRC), and Session Initiation Protocol (SIP). The antenna in radio 701 is wirelessly coupled to 5G RAN 620 over a 5GNR link. A transceiver in radio 701 is coupled to a transceiver in user circuitry 702. A transceiver in user circuitry 702 is typically coupled to the user interfaces and components like displays, controllers, and memory.

In radio 701, the antennas receive wireless signals from 5G RAN 620 that transport downlink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequency. The analog/digital interfaces convert the demodulated analog signals into digital signals for the DSPs. The DSPs transfer corresponding 5GNR symbols to user circuitry 702 over the transceivers. In user circuitry 702, the CPU executes the network applications to process the 5GNR symbols and recover the downlink 5GNR signaling and data. The 5GNR network applications receive new uplink signaling and data from the user applications. The network applications process the uplink user signaling and the downlink 5GNR signaling to generate new downlink user signaling and new uplink 5GNR signaling. The network applications transfer the new downlink user signaling and data to the user applications. The 5GNR network applications process the new uplink 5GNR signaling and user data to generate corresponding uplink 5GNR symbols that carry the uplink 5GNR signaling and data.

In radio 701, the DSP processes the uplink 5GNR symbols to generate corresponding digital signals for the analog-to-digital interfaces. The analog-to-digital interfaces convert the digital uplink signals into analog uplink signals for modulation. Modulation up-converts the uplink analog signals to their carrier frequency. The amplifiers boost the modulated uplink signals for the filters which attenuate unwanted out-of-band energy. The filters transfer the filtered uplink signals through duplexers to the antennas. The electrical uplink signals drive the antennas to emit corresponding wireless 5GNR signals to 5G RAN 620 that transport the uplink 5GNR signaling and data.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid ARQ (HARQ), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, channel coding/decoding, channel estimation/equalization, and rate matching/de-matching, scrambling/descrambling, modulation mapping/de-mapping, layer mapping/de-mapping, precoding, Resource Element (RE) mapping/de-mapping, Fast Fourier Transforms (FFTs)/Inverse FFTs (IFFTs), and Discrete Fourier Transforms (DFTs)/Inverse DFTs (IDFTs). SIP functions comprise generating SIP invite messages and processing received SIP messages for SMS and voice calling.

Figure 8:
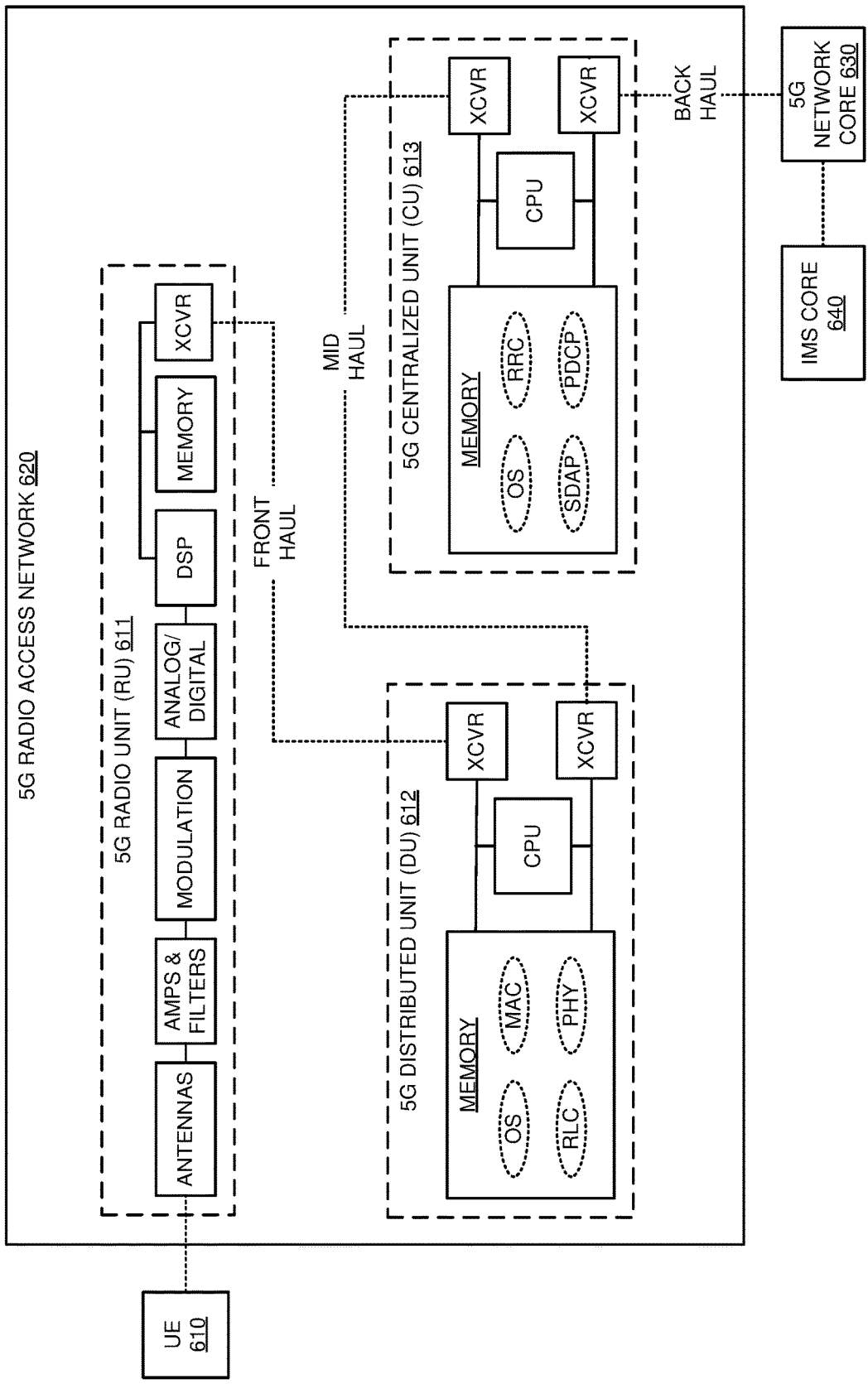
FIG. 8 illustrates a 5G Radio Access Network (RAN) in the 5G wireless communication network.

FIG. 8 illustrates 5G RU 621, 5G DU 622, and 5G CU 623 in 5G communication network 601. RU 621, DU 622, and CU 623 comprise an example of access network 111 illustrated in FIG. 1 and RAN 311 illustrated in FIG. 3, however access network 111 and RAN 311 may differ.

RU 621 comprises antennas, amplifiers, filters, modulation, analog-to-digital interfaces, DSP, memory, and transceivers (XCVRs) that are coupled over bus circuitry. UE 610 is wirelessly coupled to the antennas in RU 621 over 5GNR links. Transceivers in 5G RU 621 are coupled to transceivers in 5G DU 622 over fronthaul links like enhanced Common Public Radio Interface (eCPRI). The DSPs in RU 621 executes their operating systems and radio applications to exchange 5GNR signals with UE 610 and to exchange 5GNR data with DU 622.

For the uplink, the antennas receive wireless signals from UE 610 that transport uplink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequencies. The analog/digital interfaces convert the demodulated analog signals into digital signals for the DSPs. The DSPs transfer corresponding 5GNR symbols to DU 622 over the transceivers.

For the downlink, the DSPs receive downlink 5GNR symbols from DU 622. The DSPs process the downlink 5GNR symbols to generate corresponding digital signals for the analog-to-digital interfaces. The analog-to-digital interfaces convert the digital signals into analog signals for modulation. Modulation up-converts the analog signals to their carrier frequencies. The amplifiers boost the modulated signals for the filters which attenuate unwanted out-of-band energy. The filters transfer the filtered electrical signals through duplexers to the antennas. The filtered electrical signals drive the antennas to emit corresponding wireless signals to UE 610 that transport the downlink 5GNR signaling and data.

DU 622 comprises memory, CPU, and transceivers that are coupled over bus circuitry. The memory in 5G DU 622 stores operating systems and 5GNR network applications like PHY, MAC, and RLC. CU 623 comprises memory, CPU, and transceivers that are coupled over bus circuitry. The memory in CU 623 stores an operating system and 5GNR network applications like PDCP, SDAP, and RRC. Transceivers in 5G DU 622 are coupled to transceivers in RU 621 over front-haul links. Transceivers in DU 622 are coupled to transceivers in CU 623 over mid-haul links. A transceiver in CU 623 is coupled to network core 630 over backhaul links.

RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, guard-insertion/guard-deletion, parsing/de-parsing, control insertion/removal, interleaving/de-interleaving, FEC encoding/decoding, channel coding/decoding, channel estimation/equalization, and rate matching/de-matching, scrambling/descrambling, modulation mapping/de-mapping, layer mapping/de-mapping, precoding, RE mapping/de-mapping, FFTs/IFFTs, and DFTs/IDFTs. PDCP functions include security ciphering, header compression and decompression, sequence numbering and re-sequencing, de-duplication. SDAP functions include QoS marking and flow control. RRC functions include authentication, security, handover control, status reporting, QoS, network broadcasts and pages, and network selection.

Figure 9:
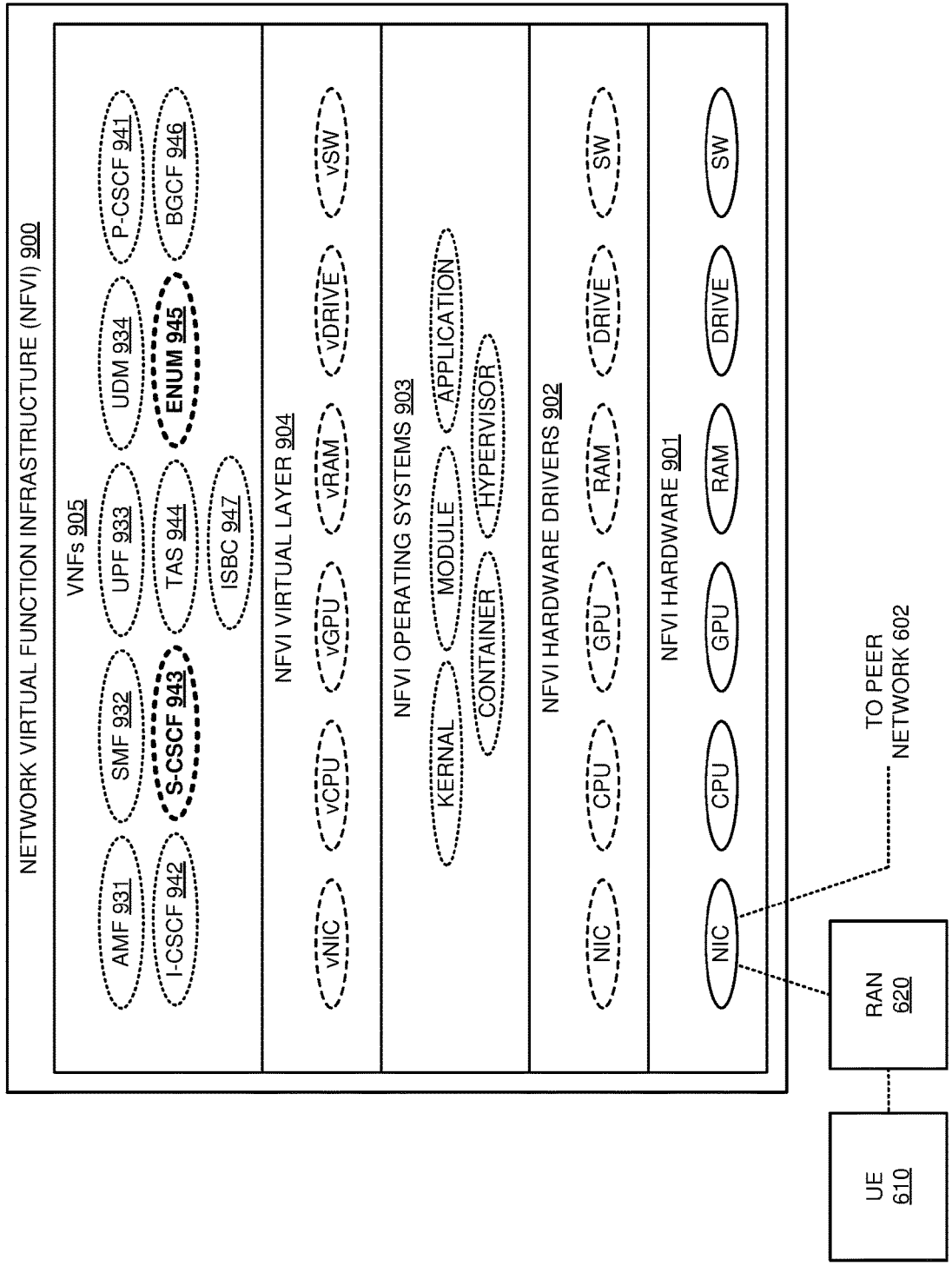
FIG. 9 illustrates a Network Function Virtualization Infrastructure (NFVI) in the 5G wireless communication network.

FIG. 9 illustrates Network Function Virtualization Infrastructure (NFVI) 900. NFVI 900 comprises an example of core network 121 and multimedia system 131 illustrated in FIG. 1 and network circuitry 320 and IMS circuitry 330 illustrated in FIG. 3, although core network 121, multimedia system 131, network circuitry 320, and IMS circuitry 330 may differ. NFVI 900 comprises NFVI hardware 901, NFVI hardware drivers 902, NFVI operating systems 903, NFVI virtual layer 904, and NFVI Virtual Network Functions (VNFs) 905. NFVI hardware 901 comprises Network Interface Cards (NICs), CPU, GPU, RAM, Flash/Disk Drives (DRIVE), and Data Switches (SW). NFVI hardware drivers 902 comprise software that is resident in the NIC, CPU, GPU, RAM, DRIVE, and SW. NFVI operating systems 903 comprise kernels, modules, applications, containers, hypervisors, and the like. NFVI virtual layer 904 comprises vNIC, vCPU, vGPU, vRAM, vDRIVE, and vSW. NFVI VNFs 905 comprise AMF 931, SMF 932, UPF 933, UDM 934, P-CSCF 941, I-CSCF 942, S-CSCF 943, TAS 944, ENUM 945, BGCF 946, and ISBC 947. Additional VNFs and network elements like AUSF, NSSF, PCF, NEF, NRF, AF, UDR, and HSS are typically present but are omitted for clarity. NFVI 900 may be located at a single site or be distributed across multiple geographic locations. For example, a first portion of NFVI 900 may be located at a first geographic location dedicated to the network functions in 5G network core 630 while a second portion of NFVI 900 may be located at a second geographic location dedicated to the IMS functions in IMS core 640. The NIC in NFVI hardware 901 is coupled to RAN 620 and to peer network 602. The connection to peer network 602 may comprise a direct or an indirect connection. NFVI hardware 901 executes NFVI hardware drivers 902, NFVI operating systems 903, NFVI virtual layer 904, and NFVI VNFs 905 to form AMF 631, SMF 632, UPF 633, UDM 634, P-CSCF 641, I-CSCF 642, S-CSCF 643, TAS 644, ENUM 645, BGCF 646, and ISBC 647.

Figure 10:
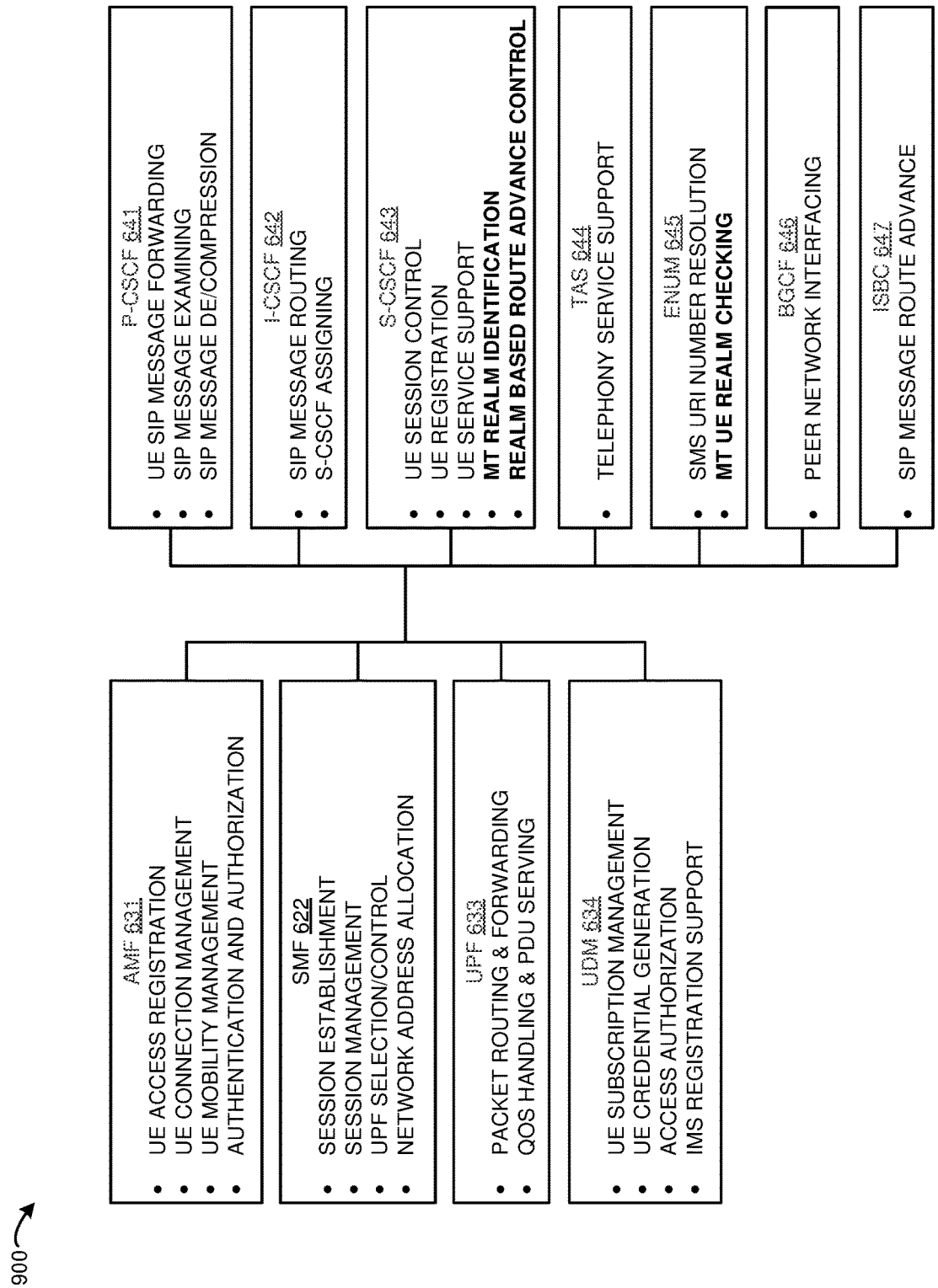
FIG. 10 further illustrates the NFVI in the 5G wireless communication network.

FIG. 10 further illustrates NFVI 900 in 5G communication network 601. AMF 631 comprises capabilities for UE access registration, UE connection management, UE mobility management, UE authentication, and UE authorization. SMF 632 comprises capabilities for session establishment, session management, UPF selection/control, and network address allocation. UPF 633 comprises capabilities for packet routing, packet forwarding, QoS handling, and PDU serving. UDM 634 comprises capabilities for UE subscription management, UE credential generation, access authorization, and IMS registration support. P-CSCF 641 comprises capabilities for UE SIP message forwarding, SIP message examining, SIP message compression, and SIP message decompression. I-CSCF 642 comprises capabilities for SIP message routing and S-CSCF assigning. S-CSCF 643 comprises capabilities for UE session control, UE registration, UE service support, MT realm identification, and realm-based route advance control. TAS 644 comprises capabilities for telephony service support. ENUM 645 comprises capabilities for SMS URI number resolution and MT UE realm checking. BGCF 646 comprises capabilities for peer network interfacing. ISBC 647 comprises capabilities for SIP message route advance.

In some examples, AMF 631 receives a registration request for UE 610 to register with network core 630 for wireless data services. The registration request comprises registration type, UE capabilities, requested slice types, IMS PDU session requests, and the like. AMF 631 transfers an identity request for delivery to UE 610. AMF 631 receives an identify indication for UE 610. AMF 631 interacts with UDM 634 and other network functions like NSSF, AUSF, and PCF to authenticate and authorize UE 610 for wireless data service. Responsive to the authentication and authorization, AMF 631 requests QoS metrics, allowed slice identifiers, service attributes, IMS permissions, and the like from UDM 634. UDM 634 accesses a subscriber profile for UE 610 to retrieve the requested user information. UDM 634 transfers the requested subscriber information to AMF 631. AMF 631 interfaces with other network functions like NSSF to select a network slice for UE 610. AMF 631 selects SMF 632 to serve UE 610 based on the data retrieved from the UDM and the selected network slice. SMF 632 selects P-CSCF 641 and UPF 633 based on the service information provided by UDM 634 and the selected network slice. SMF 632 indicates the network addresses for UPF 633 and P-CSCF 641 to AMF 631. AMF 631 generates UE context for UE 610 using the received information. The UE context comprises the QoS metrics, the slice ID, the network addresses, the service attributes, and the like. AMF 631 transfers the UE context for delivery to UE 610.

UPF 633 receives an IMS registration request generated by UE 610. UPF 633 reads the network address in the request and forwards the request to P-CSCF 641. P-CSCF 641 receives the registration request and performs a DNS query to retrieve a network address for I-CSCF 642. P-CSCF 641 forwards the registration request to I-CSCF 642. I-CSCF 642 requests S-CSCF data from UDM 634. UDM 634 identifies S-CSCF 643 is available and transfers the network address for S-CSCF 643 to I-CSCF 642. I-CSCF 642 selects S-CSCF 643 to register UE 610 and forwards the registration request to S-CSCF 643. S-CSCF 643 retrieves user authentication data associated with UE 610 from UDM 634. The authentication data includes a random number, an authentication token, a signed result, a cipher key, and an integrity key. S-CSCF 643 uses the retrieved authentication data to verify the identity of UE 610 before registering UE 610 for IMS service. S-CSCF 643 exchanges registration signaling with UE 610 over P-CSCF 641 to authenticate UE 610. Upon authentication, S-CSCF 643 registers UE 610 for IMS services.

UPF 633 receives a SIP invite generated by UE 610 to initiate an MO IMS voice session with MT UE 650. The MO SIP invite comprises the phone number of UE 650. UPF 633 forwards the SIP invite message to P-CSCF 641. P-CSCF 641 interfaces with S-CSCF 643 to identify the destination for the SIP invite. S-CSCF 643 requests number translation from ENUM 645. ENUM 645 translates the phone number of MT UE 650 in the SIP invite to a SIP URI associated with peer network 602. ENUM 645 identifies the realm of MT UE 650. ENUM 645 indicates the SIP URI and the realm ID for peer network 602 to S-CSCF 643. S-CSCF 643 associates the realm ID with the MO SIP invite and caches the association in memory. S-CSCF 643 transfers the MO SIP invite and SIP URI to I-CSCF 642. In this example, network 601 does not possess a network-to-network interface with peer network 602. As a result, I-CSCF 642 directs BGCF 646 to deliver the MO SIP invite. BGCF 646 selects one of S-CSCFs 683 in peer IMS 680 based on the SIP URI and transfers the MO SIP invite for delivery to the selected S-CSCF in peer network 602. For example, the MO SIP invite may traverse a BGCF or border controller in peer IMS 680 before delivery to the selected peer S-CSCF. In examples where network 601 comprises a network-to-network interface with peer network 602, I-CSCF 642 transfers the SIP invite using ISBC 647 instead of BGCF 646.

Subsequently, the selected S-CSCF in peer network 602 times out and fails to transfer the MO SIP invite preventing the establishment of the voice session. BGCF 647 detects the time out (e.g., using an internal clock) and responsively notifies S-CSCF 643 of the error. S-CSCF 643 retrieves the realm association for the MO SIP invite from memory. S-CSCF 643 enters the realm ID into a data structure that governs route advance eligibility for different peer networks.

In this example, peer network 602 is not eligible for route advance. S-CSCF 643 receives the output from the data structure indicating the ineligibility. In response, S-CSCF 643 transfers a call failure error message for MO UE 610 to P-CSCF 641. P-CSCF 641 transfers the error message to UPF 633. UPF 633 forwards the error message to MO UE 610 over RAN 620.

Figure 11:
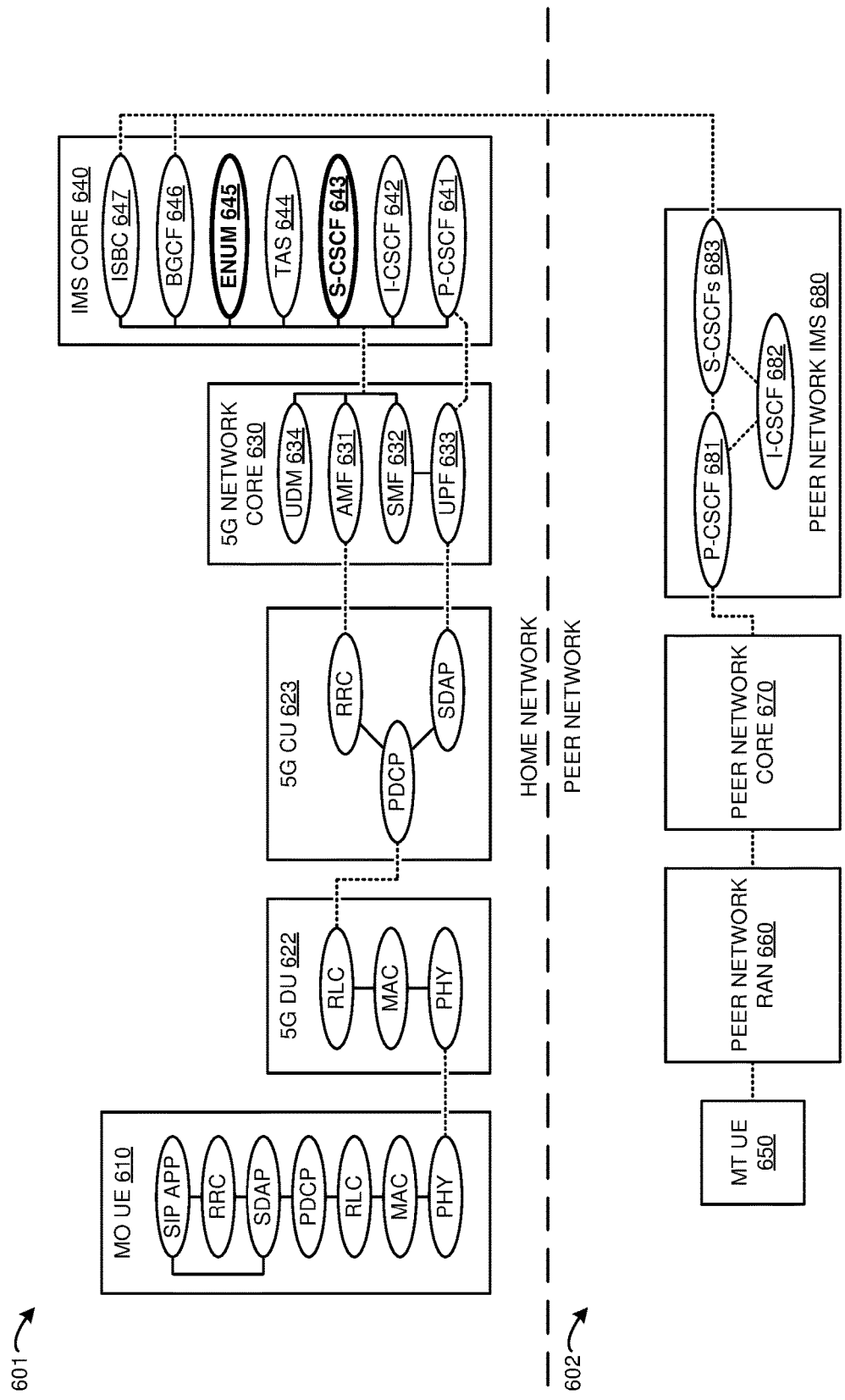
FIG. 11 illustrates an exemplary operation of the 5G wireless communication network to perform realm-based route advance.

FIG. 11 illustrates an exemplary operation of 5G communication network 601 to perform realm-based route advance for IMS voice calls. The operation may vary in other examples. In operation, UE 610 wirelessly attaches to RAN 620 and the RRC in UE 610 exchanges attachment signaling with the RRC in CU 623 over the PDCPs, RLCs, MACs, and PHYs to establish an RRC connection. The RRC in CU 623 transfers a registration request for UE 610 comprising a registration type, UE capabilities, requested slice types, and IMS PDU session requests to AMF 631. AMF 631 transfers an identity request for UE 610 to the RRC in CU 623. The RRC in CU 623 forwards the registration request to the RRC in UE 610 over the PDCPs, RLCs, MACs, and PHYs. The RRC in UE 610 transfers an identity indication to the RRC in CU 623 over the PDCPs, RLCs, MACs, and PHYs. The RRC in CU 623 forwards the identity indication to AMF 631. AMF 631 interacts with the other network functions to authenticate and authorize UE 610 for wireless data service.

Responsive to the authentication and authorization, AMF 631 retrieves service metrics for MO UE 610 from UDM 634 and selects a network slice for UE 610. The UDM pulls the requested data from a subscriber profile for UE 610 and transfers the data to AMF 631. AMF 631 selects SMF 632 to serve UE 610 based on the service metrics. SMF 632 selects P-CSCF 641 and UPF 633 based on the service metrics and network slice. SMF 632 indicates the network addresses for UPF 633 and P-CSCF 641 to AMF 631. AMF 631 generates UE context comprising the slice ID, the network addresses, the service attributes, and the like. AMF 631 transfers the UE context to the RRC in CU 623. The RRC in CU 623 transfers the UE context to the RRC in UE 610 over the PDCPs, RLCs, MACs, and PHYs.

Responsive to network registration, UE 610 initiates an IMS registration procedure to register with IMS core 640. The RRC in UE 610 drives the SIP application to generate a SIP registration message. The SDAP in UE 610 addresses the SIP registration message using the network address for P-CSCF 641 in the UE context. The SDAP in UE 610 transfers the SIP registration message to the SDAP in CU 623 over the PDCPs, RLCs, MACs, and PHYs. The SDAP in CU 623 transfers the SIP registration message to UPF 633. UPF 633 transfers the SIP registration to P-CSCF 641 using the network address for P-CSCF 641.

P-CSCF 641 receives the registration request and retrieves the network address for I-CSCF 642 using a DNS query. P-CSCF 641 forwards the registration request to I-CSCF 642. I-CSCF 642 requests S-CSCF selection data from UDM 634. UDM 634 identifies available S-CSCFs in IMS core 640, including S-CSCF 643. I-CSCF 642 selects S-CSCF 643 to register UE 610 and forwards the registration request to S-CSCF 643. S-CSCF 643 retrieves user authentication data like random numbers, authentication tokens, signed results, and secret keys from UDM 634. S-CSCF 643 uses the retrieved authentication data to verify the identity of UE 610 before registering UE 610 for IMS service. S-CSCF 643 exchanges registration signaling for UE 610 with P-CSCF 641. P-CSF 641 exchanges the registration signaling with UDM 633. UDM 633 exchanges the registration signaling with the SDAP in CU 623. The SDAP in CU 623 exchanges the registration signaling with the SDAP in UE 610 over the PDCPs, RLCs, MACs, and PHYs. The SDAP in UE 610 indicates the registration signaling to the RRC in UE 610. Upon authentication, S-CSCF 643 registers UE 610 for IMS services.

UPF 633 receives a SIP invite generated by UE 610 to initiate an MO IMS voice session with MT UE 650. The MO SIP invite comprises the phone number of UE 650. UPF 633 forwards the SIP invite message to P-CSCF 641. P-CSCF 641 interfaces with I-CSCF 642 and S-CSCF 643 to deliver the SIP invite to a message destination. S-CSCF 643 processes the SIP invite to select a message destination to establish the MO IMS session. S-CSCF 643 requests number translation from ENUM 645. ENUM 645 translates the phone number of MT UE 650 to a SIP URI associated with peer network 602. ENUM 645 identifies the realm of MT UE 650. ENUM 645 indicates the SIP URI and the realm ID for peer network 602 to S-CSCF 643. S-CSCF 643 stores realm ID for peer network 602 in association with the MO SIP invite and. S-CSCF 643 transfers the MO SIP invite and SIP URI to I-CSCF 642. In this example, network 601 comprises a network-to-network interface with peer network 602. As a result, I-CSCF 642 directs ISBC 647 to deliver the MO SIP invite. ISBC 647 selects one of S-CSCFs 683 in peer IMS 680 based on the SIP URI and transfers the MO SIP invite for delivery to the selected S-CSCF in peer network 602.

The selected one of S-CSCFs 683 in peer network IMS 680 malfunctions and transfers an error message to ISBC 647. ISBC 647 detects the error message and responsively forwards the error message to S-CSCF 643. S-CSCF 643 retrieves the realm ID for peer network 602 based on the association with the MO SIP invite sent by MO UE 610. S-CSCF 643 compares the realm ID to a table that indicates network realms eligible for route advance. In this example, peer network 602 is eligible for route advance. S-CSCF 643 directs ISBC 647 to initiate route advance for the MO SIP invite based on the eligibility of peer network 602. S-CSCF 643 flags the MO SIP invite with a retry attempted marker and stores this indication in memory. ISBC 647 selects a different one of S-CSCFs 683 in peer network IMS 680. ISBC 647 transmits the MO SIP invite to the different one of S-CSCFs 683 to retry the setup of the voice session between MO UE 610 and MT UE 650.

The second selected one of S-CSCFs 683 for the route advance procedure also malfunctions and transfers an error message to ISBC 647. ISBC 647 detects this second error message and responsively forwards the second error message to S-CSCF 643. S-CSCF 643 retrieves the realm ID for peer network 602 based on the association with the MO SIP invite sent by MO UE 610. S-CSCF 643 determines peer network 602 is no longer eligible for route advance since route advance has already been attempted once as indicated by the flag. S-CSCF 643 prevents ISBC 647 from attempting route advance for the MO SIP invite and transfers the error notification to P-CSCF 641. P-CSCF 641 transfers the error notification to UPF 633 which forwards the error notification to the SDAP in CU 623. The SDAP in CU 623 transfers the error notification to the SDAP in UE 610 over the PDCPs, RLCs, MACs, and PHYs. The SDAP in UE 610 notifies the RRC in UE 610 of the call failure.

The wireless data network circuitry described above comprises computer hardware and software that form special-purpose network circuitry to perform realm-based route advance for IMS voice calls. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to perform realm-based route advance for IMS voice calls.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to perform route advance for Internet Protocol Multimedia Subsystem (IMS) voice calls, the method comprising:
    Call Session Control Function (CSCF) circuitry receiving a Mobile Originating Session Initiation Protocol (MO SIP) invite message sent from an originating User Equipment (UE) for a voice call to a terminating UE;
    the CSCF circuitry transferring a request to E.164 Number Mapping (ENUM) circuitry to route the MO SIP invite;
    the ENUM circuitry receiving the request, determining routing information for the MO SIP invite, determining a realm type for the terminating UE, and indicating the routing information and the realm type to the CSCF circuitry; and
    the CSCF circuitry receiving the routing information and the realm type, transferring the MO SIP invite based on the routing information, and storing the realm type in association with the MO SIP invite.

2. The method of claim 1 further comprising:
    the CSCF circuitry receiving a SIP error response transferred by a peer network, correlating the SIP error response to the realm type for the terminating UE, determining retry is allowed based on the realm type, and transferring a retry request based on the realm type.

3. The method of claim 2 further comprising:
    the CSCF circuitry maintaining a data structure that indicates allowed peer networks for SIP retry requests; and wherein:
    the CSCF circuitry determining retry is allowed based on the realm type comprises entering the realm type to the data structure which outputs an indication that retry is allowed for the realm type.

4. The method of claim 1 further comprising:
    the CSCF circuitry receiving a second MO SIP invite message sent from the originating UE for a second voice call to a second terminating UE;
    the CSCF circuitry transferring a second request to the ENUM circuitry to route the second MO SIP invite;
    the ENUM circuitry receiving the second request, determining additional routing information for the second MO SIP invite, determining a different realm type for the second terminating UE, and indicating the additional routing information and the different realm type to the CSCF circuitry; and
    the CSCF circuitry receiving the additional routing information and the different realm type, transferring the second MO SIP invite based on the additional routing information, and storing the different realm type in association with the second MO SIP invite.

5. The method of claim 4 further comprising:
    the CSCF circuitry receiving a second SIP error response transferred by a peer network, correlating the second SIP error response to the different realm type for the second terminating UE, determining retry is not allowed based on the different realm type, forwarding the second SIP error response to the originating UE without transferring another retry request, and transferring a local announcement to the originating UE to notify the originating UE the second voice call could not be completed on the peer network.

6. The method of claim 5 further comprising:
    the CSCF circuitry maintaining a data structure that indicates allowed peer networks for SIP retry requests; and wherein:
    the CSCF circuitry determining retry is not-allowed based on the different realm type comprises entering the different realm type to the data structure which outputs an indication that retry is not allowed for the different realm type.

7. The method of claim 1 wherein:
    transferring the MO SIP invite based on the routing information comprises the CSCF circuitry transferring the MO SIP invite for delivery to Interconnect Session Border Controller (ISBC) circuitry; and
    the ISBC circuitry transferring the MO SIP invite to a peer network.

8. A wireless communication network configured to perform route advance for Internet Protocol Multimedia Subsystem (IMS) voice calls, the wireless communication network comprising:
    Call Session Control Function (CSCF) circuitry configure to:

receive a Mobile Originating Session Initiation Protocol (MO SIP) invite message sent from an originating User Equipment (UE) for a voice call to a terminating UE;

transfer a request for routing information for the MO SIP invite; and receive the routing information and a realm type indication, transfer the MO SIP invite based on the routing information, and store the realm type indication in association with the MO SIP invite; and E.164 Number Mapping (ENUM) circuitry configured to:

receive the request for the routing information, determine the routing information for the MO SIP invite, determine the realm type for the terminating UE, and indicate the routing information and the realm type to the CSCF circuitry.

9. The wireless communication network of claim 8 wherein the CSCF circuitry is further configured to:

receive a SIP error response transferred by a peer network;

correlate the SIP error response to the realm type for the terminating UE;

determine retry is allowed based on the realm type; and transfer a retry request based on the realm type.

10. The wireless communication network of claim 9 wherein the CSCF circuitry is further configured to:

maintain a data structure that indicates allowed peer networks for SIP retry requests; and enter the realm type to the data structure which outputs an indication that retry is allowed for the realm type.

11. The wireless communication network of claim 8 wherein:

the CSCF circuitry is further configured to:

receive a second MO SIP invite message sent from the originating UE for a second voice call to a second terminating UE;

transfer a second request for additional routing information for the second MO SIP invite; and receive the additional routing information and a different realm type indication, transfer the second MO SIP invite based on the additional routing information, and store the different realm type in association with the second MO SIP invite; and the ENUM circuitry is further configured to:

receive the second request for the additional routing information, determine the additional routing information for the second MO SIP invite, determine the different realm type for the second terminating UE, and indicate the additional routing information and the different realm type to the CSCF circuitry.

12. The wireless communication network of claim 11 wherein the CSCF circuitry is further configured to:

receive a second SIP error response transferred by a peer network;

correlate the second SIP error response to the different realm type for the second terminating UE;

determining retry is not allowed based on the different realm type;

forward the second SIP error response to the originating UE without transferring another retry request; and transfer a local announcement to the originating UE to notify the originating UE the second voice call could not be completed on the peer network.

13. The wireless communication network of claim 12 wherein the CSCF circuitry is further configured to:

maintain a data structure that indicates allowed peer networks for SIP retry requests; and enter the different realm type to the data structure which outputs an indication that retry is not allowed for the different realm type.

14. The wireless communication network of claim 8 further comprising:

Interconnect Session Border Controller (ISBC) circuitry; and wherein the CSCF circuitry is further configured to:

transfer the MO SIP invite for delivery to the ISBC circuitry; and wherein the ISBC circuitry is configured to:

transfer the MO SIP invite to a peer network.

15. A method of operating a wireless communication network to perform route advance for Internet Protocol Multimedia Subsystem (IMS) voice calls, the method comprising:

receiving a Mobile Originating Session Initiation Protocol (MO SIP) invite message sent from an originating User Equipment (UE) for a voice call to a terminating UE;

transferring a request to a number mapping server to route the MO SIP invite wherein the number mapping server receives the request, determines routing data for the MO SIP invite, determines a realm type for the terminating UE, and returns the routing data and realm type;

receiving the routing data and the realm type from the number mapping server;

transferring the MO SIP invite based on the routing data; and storing the realm type in association with the MO SIP invite.

16. The method of claim 15 further comprising:

receiving a SIP error response from a peer network;

correlating the SIP error response to the realm type for the terminating UE;

determining retry is allowed based on the realm type; and transferring a retry request based on the realm type.

17. The method of claim 16 further comprising:

maintaining a data structure that indicates allowed peer networks for SIP retry requests; and wherein:

determining retry is allowed based on the realm type comprises entering the realm type to the data structure which outputs an indication that retry is allowed for the realm type.

18. The method of claim 15 further comprising:

receiving a second MO SIP invite message sent from the originating UE for a second voice call to a second terminating UE;

retrieving additional routing data for the second MO SIP invite and a different realm type for the second terminating UE;

transferring the second MO SIP invite based on the additional routing data; and storing the different realm type in association with the second MO SIP invite.

19. The method of claim 18 further comprising:

receiving a second SIP error response transferred by a peer network;

correlating the second SIP error response to the different realm type for the second terminating UE;

determining retry is not allowed based on the different realm type;

forwarding the second SIP error response to the originating UE without transferring another retry request; and transferring a local announcement to the originating UE to notify the originating UE the second voice call could not be completed on the peer network.

20. The method of claim 19 further comprising:
maintaining a data structure that indicates allowed peer networks for SIP retry requests; and wherein:
determining retry is not-allowed based on the different realm type comprises entering the different realm type to the data structure which outputs an indication that retry is not allowed for the different realm type.

* * * * *